Figure 1:
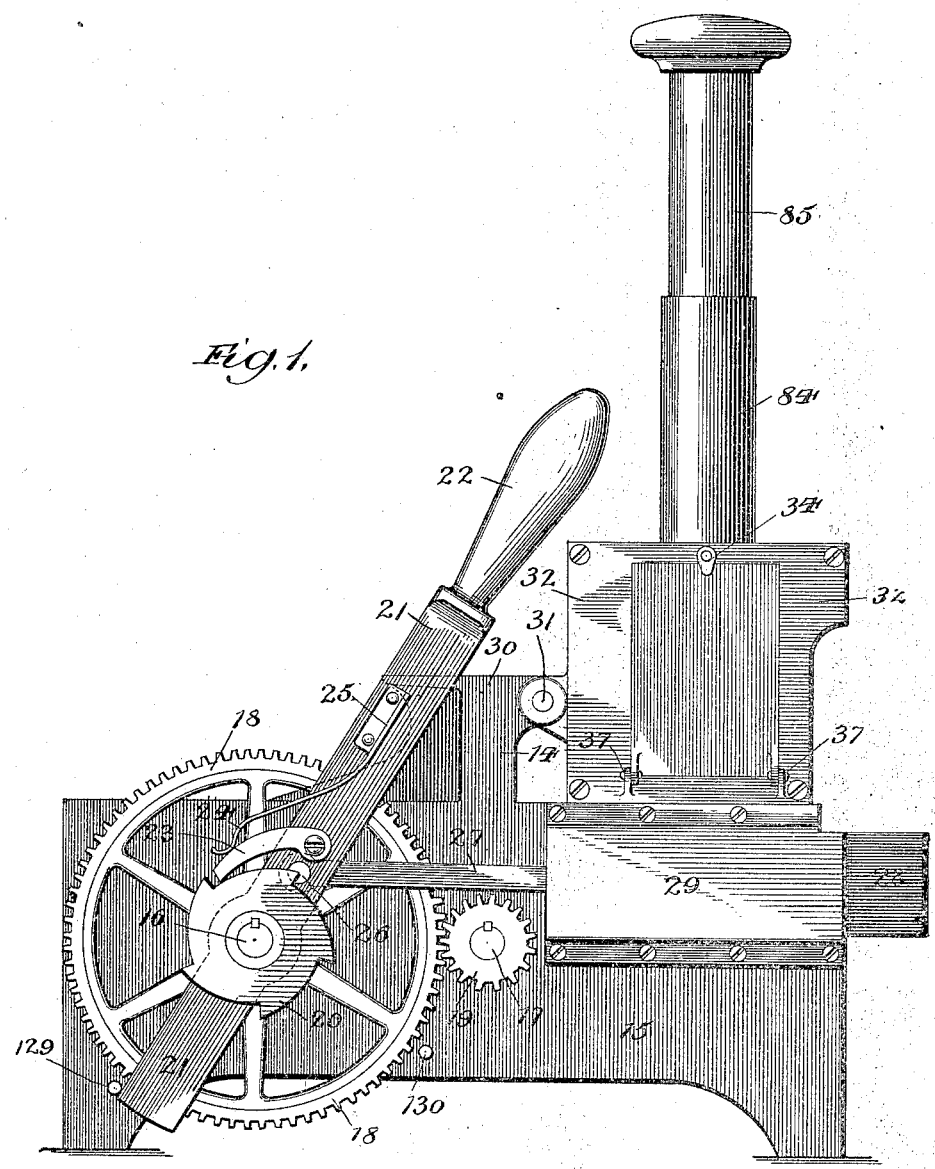

No. 725,054. PATENTED APR. 14, 1903.
J. P. EASTMAN & T. F. HAWLEY.
TICKET PRINTING AND ISSUING MACHINE.
APPLICATION FILED MAR. 11, 1901.
NO MODEL. 6 SHEETS—SHEET 1.

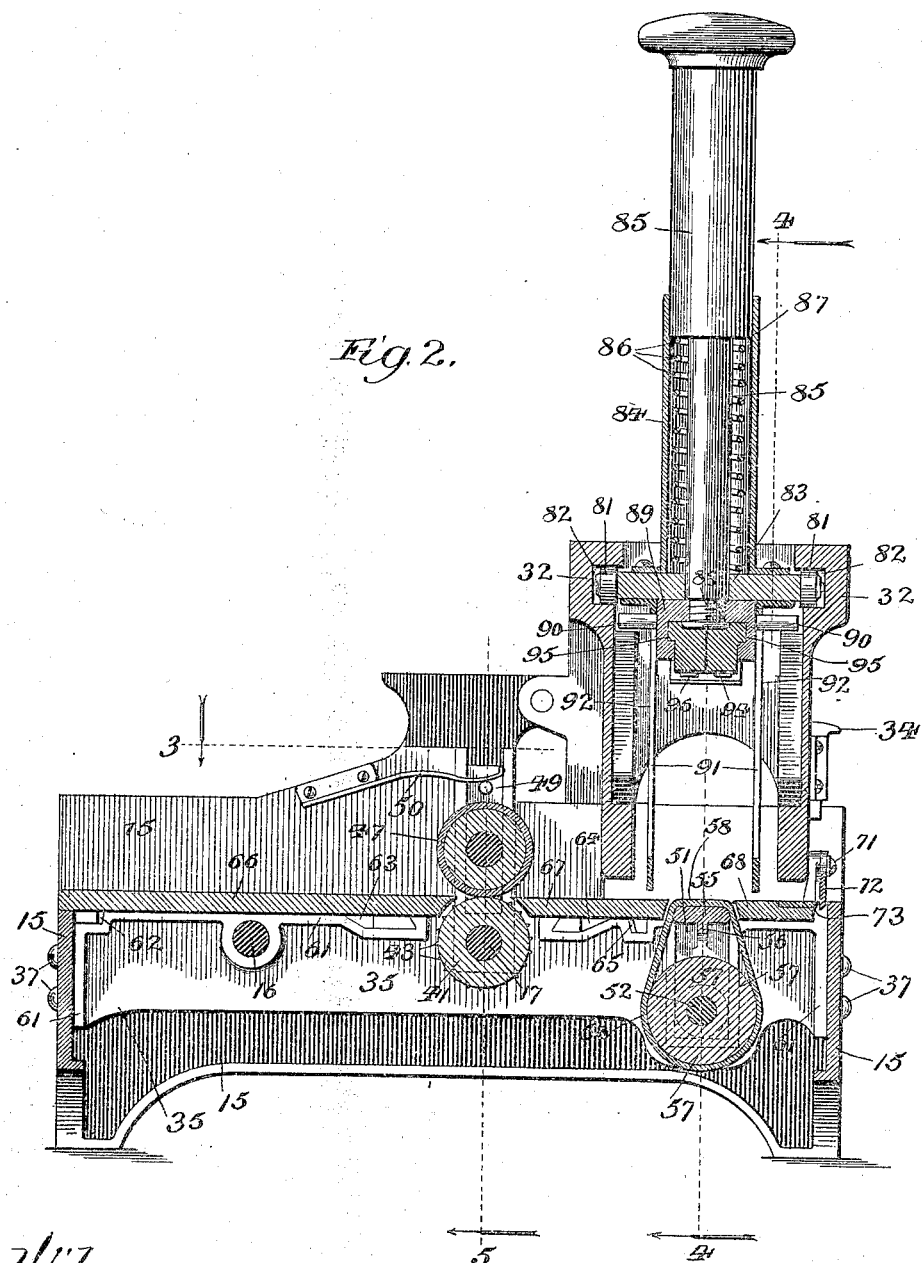

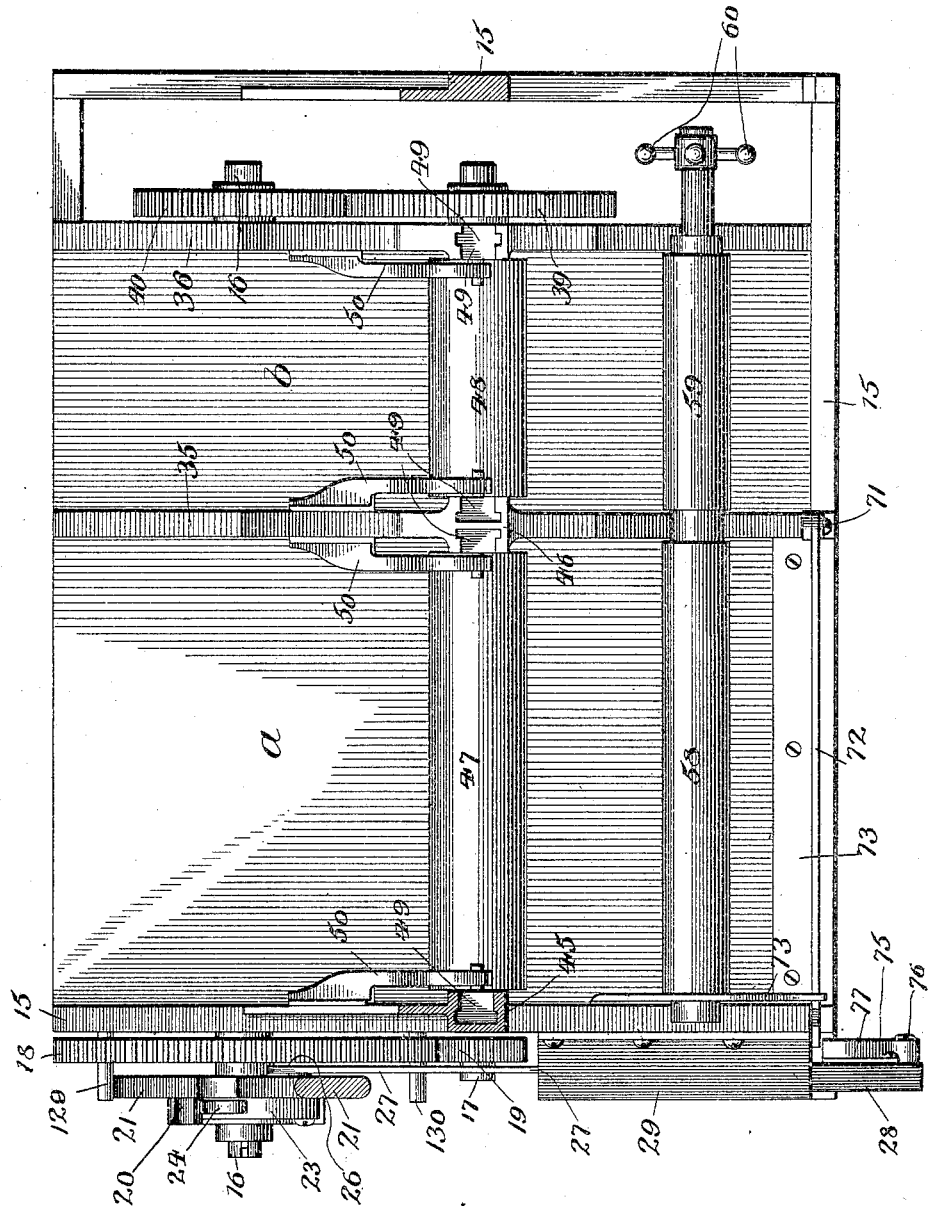

No. 725,054. PATENTED APR. 14, 1903.
J. P. EASTMAN & T. F. HAWLEY.
TICKET PRINTING AND ISSUING MACHINE.
APPLICATION FILED MAR. 11, 1901.
NO MODEL. 6 SHEETS—SHEET 4.
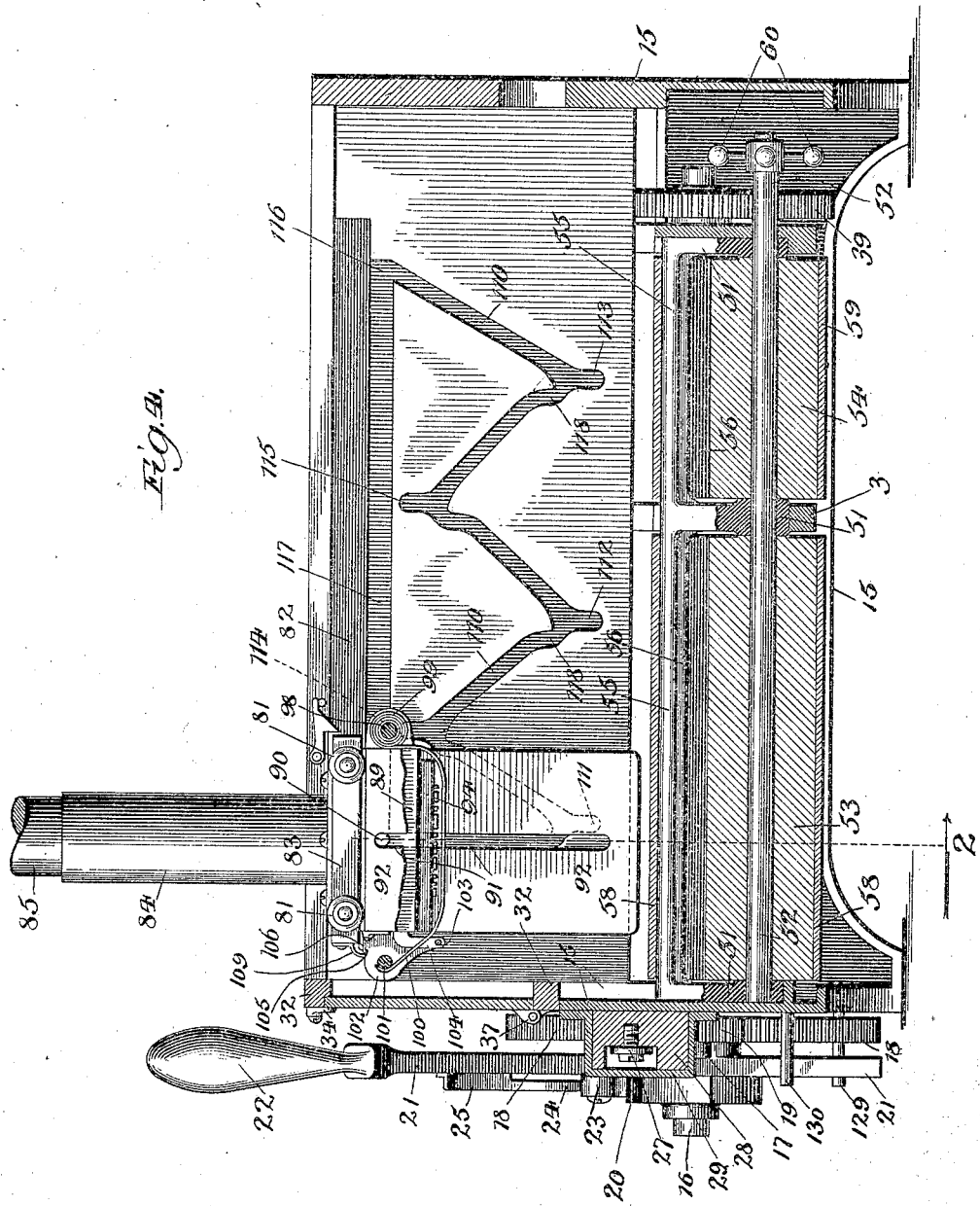
Witnesses:
C. E. Gaylord,
Lute J. Alter,
Inventors:
John P. Eastman,
Tracy F. Hawley,
By Dwight B. Cheever
Atty.

No. 725,054. PATENTED APR. 14, 1903.
J. P. EASTMAN & T. F. HAWLEY.
TICKET PRINTING AND ISSUING MACHINE.
APPLICATION FILED MAR. 11, 1901.
NO MODEL. 6 SHEETS—SHEET 5.
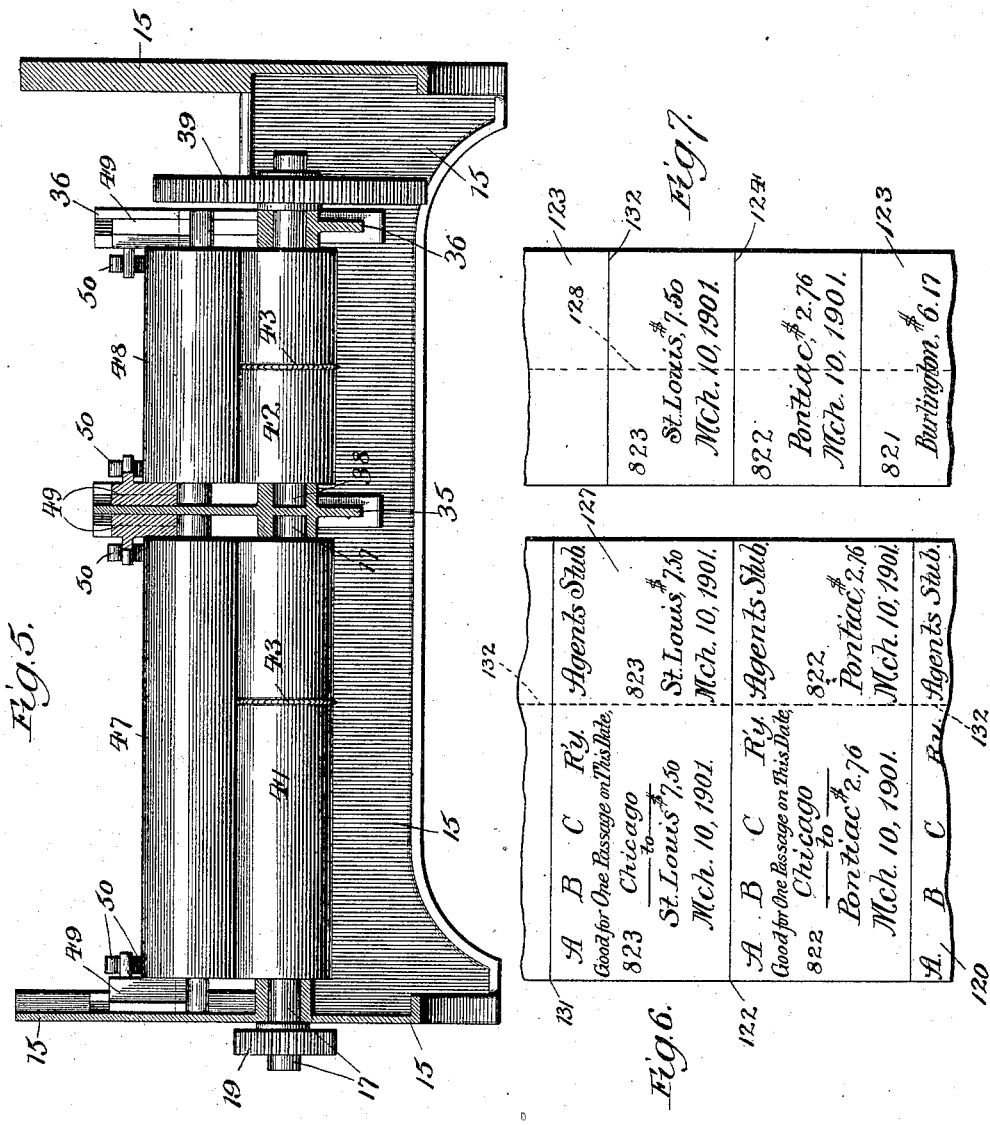

No. 725,054. PATENTED APR. 14, 1903.
J. P. EASTMAN & T. F. HAWLEY.
TICKET PRINTING AND ISSUING MACHINE.
APPLICATION FILED MAR. 11, 1901.
NO MODEL. 6 SHEETS—SHEET 6.
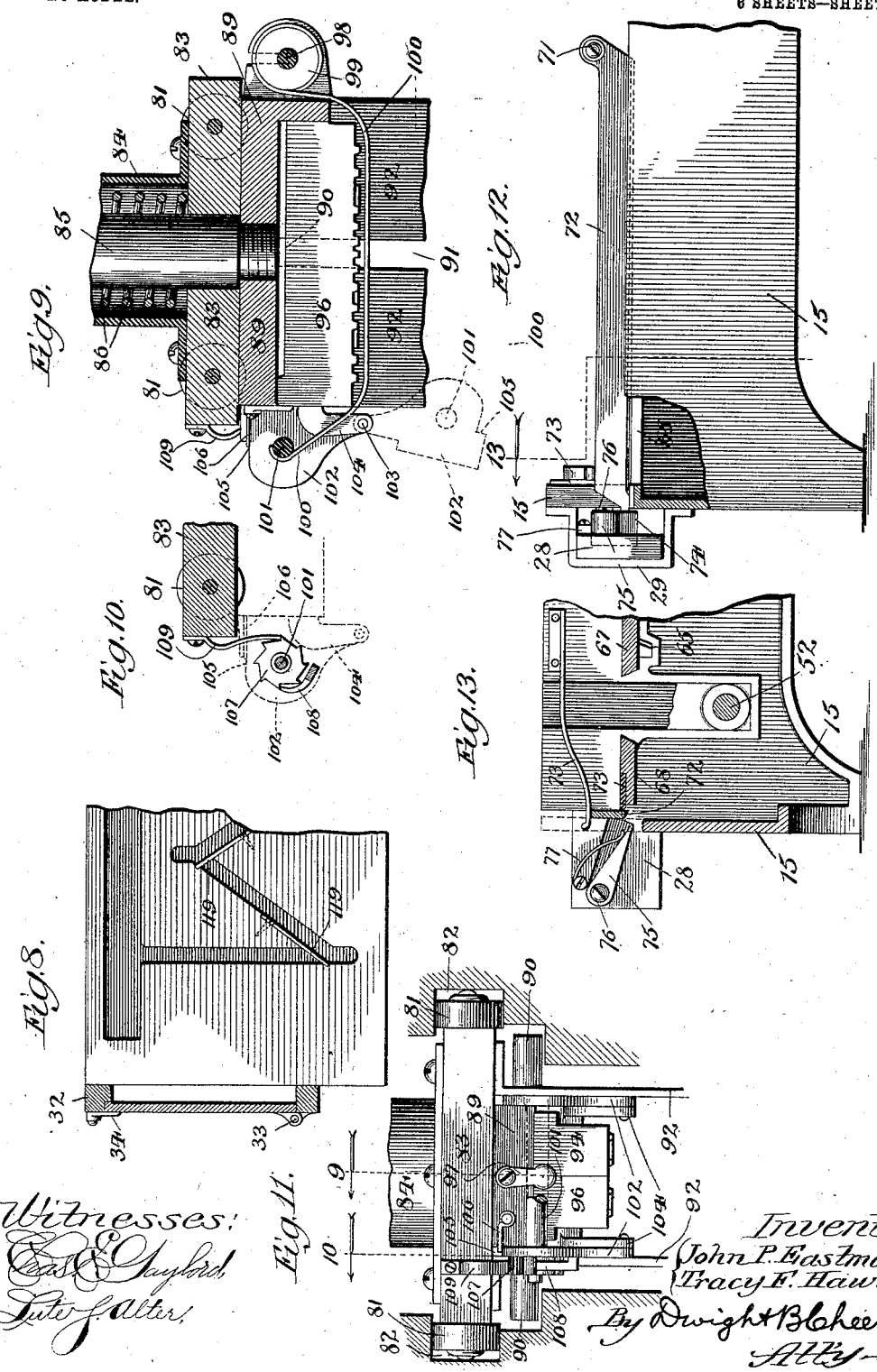

UNITED STATES PATENT OFFICE.

JOHN P. EASTMAN, OF CHICAGO, ILLINOIS, AND TRACY F. HAWLEY, OF MILWAUKEE, WISCONSIN.

TICKET PRINTING AND ISSUING MACHINE.

SPECIFICATION forming part of Letters Patent No. 725,054, dated April 14, 1903.

Application filed March 11, 1901. Serial No. 50,690. (No model.)

*To all whom it may concern:*

Be it known that we, JOHN P. EASTMAN, a resident of Chicago, in the county of Cook and State of Illinois, and TRACY F. HAWLEY, a resident of Milwaukee, in the county of Milwaukee and State of Wisconsin, both citizens of the United States, have invented a new and useful Ticket Printing and Issuing Machine, of which the following is a specification in its best form now known to us, reference being had to the accompanying drawings, in which similar characters indicate the same parts throughout the several views.

The machine may be used on many sorts of tickets; but as it is especially useful on railroads it will be described as so used.

The usual ticket system in use on railroads requires a station agent at any given point to keep a stock of separate tickets to each principal station on the road and blank tickets for use to less important stations, in which the name of the destination has to be printed by a rubber stamp or written by hand. This system is very inconvenient and expensive in that it requires a large idle investment in such tickets and in the space and cases to hold them. It also involves a great deal of trouble and liability of error in accounting, and such tickets are always subject to forgery.

The object of our invention is to provide a machine which will cost comparatively little and be easily and cheaply operated and which will print and issue tickets to any station on the road from a continuous roll of paper.

Another object of our invention is to provide such a machine which will print the ticket in such a form that it cannot be easily counterfeited or altered and at the same time provide a record within the machine on which an accurate accounting of the tickets issued can be had.

The invention consists of a machine capable of accomplishing the above-mentioned and other objects.

It also consists in the details of construction hereinafter more fully described and claimed.

In the drawings, Figure 1 is an end elevation of a machine embodying our invention. Fig. 2 is a sectional end elevation of the same. Fig. 3 is a plan view from line 3 of Fig. 2. Fig. 4 is a rear sectional view on line 4 of Fig. 2. Fig. 5 is a corresponding view on line 5 of Fig. 2. Figs. 6 and 7 are detail views of the ticket, its stub, and the record-roll which comes from the machine. Fig. 8 is a detail view of a modified construction of the cam of Fig. 4. Fig. 9 is a sectional detail view through the center of the stamping mechanism, taken on line 9 of Fig. 11. Fig. 10 is a detail view of the ribbon-tightener on line 10 of Fig. 11. Fig. 11 is an end detail view of the stamp. Fig. 12 is a detail view of the knife, and Fig. 13 is a detail on line 13 of Fig. 12.

In general the machine consists of two tables $a$ and $b$, adapted to have paper from prepared rolls pass over them and provided with means for moving the paper. From the paper on table $a$ the ticket and its stub are printed, the line between the two perforated, so that they can be separated, and the two cut off. On the paper passing over table $b$ a continuous record of the tickets sold is printed. As a record does not require as much space on the paper as the size of a ticket, the paper on this table is driven at a much slower speed than the ticket-paper on table $a$.

Referring to Fig. 1, the numeral 15 indicates the rectangular frame, preferably of cast-iron, of the machine, in which are journaled the shafts 16 and 17, to which are keyed the gear-wheels 18 and 19, meshing together, as shown. Rigidly secured to shaft 18 is ratchet-wheel 20. Loosely journaled on shaft 16 between gear 18 and ratchet 20 is a lever-arm 21, having its upper end terminating in a handle 22. Pivoted to this lever 21 is a pawl 23, adapted to engage ratchet-wheel 20 and held in such engagement by means of a spring 24, secured to the lever at 25. Pivoted to lever 21 at 26 is a connecting-rod 27, which has its other end attached to a cross-head 28, adapted to slide backward and forward inside of a housing 29, secured to the frame 15. Rising from the frame 15 is an upright 14, terminating in a flat table portion 30. Pivotally attached at 31 to this upright 14 is a stamp-case 32, adapted to swing back and rest upon the table 30. This stamp-case 32 has an end door hinged at 33 and secured at its upper edge by a button 34 or other suitable catch. The stamp-case 32 is secured in working position to the frame 15 by means of the bolt 34 or other suitable fastening.

The frame 15 has sides and ends, but no top, integral with it. Across the frame are two girders 35 and 36, fastened to the frame by the screws 37. These girders 35 and 36 carry the rear end of shaft 16, and the girder 35 carries the rear end of shaft 17, heretofore described. In line with shaft 17 and with its ends bearing in girders 35 and 36 is an independent shaft 38. On the rear end of shaft 38 is a gear-wheel 39, meshing with another gear-wheel 40, rigidly secured to the rear end of shaft 16. The proportions of gears 18, 19, 39, and 40 are such that shaft 38 is rotated much slower than shaft 17.

Rigidly secured to shaft 17 is a roller 41, and a similar roller 42 is secured to shaft 38. Projecting from each of these rollers are sharp teeth 43, adapted to perforate paper passing over the roller, so that it can be easily torn apart, and also adapted to act as a positive feed. In the practical operation of my invention those on roller 42 are required for the latter function only, and any other positive feed may be substituted.

Loosely journaled in guides 45 in the front end of frame 15 and in guides 46 in the forward side of girder 35 is a rubber-covered roller 47. Similarly mounted between girders 35 and 36 over roller 42 is another rubber roller 48. The bearings of these two rollers carry blocks 49, against which springs 50 press, thus forcing each upper roller into close contact with the roller below. If desired, both upper and lower rollers of each pair may be rubber-covered; but I have shown only the upper ones so constructed.

In the bottom of a slot 51 in the front of frame 15 and girders 35 and 36 is journaled a shaft 52, carrying two rollers 53 and 54. Fitting into the top of this slot 51 and closing the same over each roller is a plate 55. This plate 55 is held rigid by resting against the edges of the slot 51, as shown in Fig. 2, and by having the lug 56 entering a groove 57 in the wall of the frame. Over this plate 51 and the two rollers 53 and 54 are stretched two belts 58 and 59, of soft material, preferably of rubber. The portion of these belts on the top of plate 55 forms a cushion-pad for the printing-stamp to strike upon. On the rear end of shaft 52 is a hand-wheel 60, by which the shaft and with it the belt 58 and 59 may be turned from time to time when it is desired to present a fresh surface of rubber to the stamp. The front of the frame 15 and each girder has a web 61 along its upper edge, in which are recesses 62, 63, 64, and 65, shaped as shown.

On the top of the front of frame 15 and girder 35 are two plates 66 and 67, having lugs corresponding to the recesses above mentioned adapted to fit in them and be held rigidly in position. The tops of these plates 66 and 67 come slightly below the tops of roller 41 and rubber belt 58, so that a rigid working table $a$ is formed with these parts projecting through, as shown. The surface of the table is completed by the plate 68, rigidly secured to frame 15, and girder 35. In the same manner the other table, $b$, on a level with roller 42 and belt 59, is constructed.

Pivoted to the central girder 35 at 71 is a knife 72, adapted to shear against the shearing-plate 73, let into the table-plate 68. This knife 72 is pressed down by a spring 73. The knife tapers at the end and has a point 74 extending outside the frame 15 and inside the housing 29, where it engages and travels over a cam 75, shaped as shown in Fig. 13, pivoted at 76 to the cross-head. This cam 75 is normally pressed downward by the spring 77, which is entirely clear of the end 74 of the knife.

Mounted on wheels 81, running in grooves 82 in the sides of the case 32, is a stamp-carriage 83. Rigidly secured to this carriage is a circular tube 84, in which is mounted the stamp-handle 85. This handle is normally held up by a coiled spring 86, interposed within the case 84, between the top of the carriage 83 and a shoulder 87 on the handle 85. Rigidly secured to the lower end of handle 85 by means of screw-threads 88 is a stamp-base 89. Extending from the sides of this stamp-base are pins 90, adapted to slide up and down in guide-slots 91 of guard-plates 92, rigidly secured to the bottom of stamp-carriage 83. The stamp-base 89 moves up and down between these guards when handle 85 is depressed. The date-stamps 94 and the station-stamps 96 are adapted to slide in and out of the stamp-base 89 in the grooves 95, so that different station names and dates may be inserted. The stamps are held in place in the stamp-base by means of a catch 97. If desired, the stamp-base may be made so that more than two independent stamp-blocks, each having a different stamp, may be inserted.

Journaled at 98 in arms projecting from the rear of stamp-base 89 is a spool 99, filled with carbon ribbon 100. The journal 98 is secured by a spring (not shown) or other suitable means so that it does not turn easily and there will be a tension on the ribbon when it is attempted to pull it off the spool. The end of this ribbon is carried in between guards 92 under the stamps 94 and 96 and is secured to spindle 101, journaled in a spool-holder 102. This spool-holder 102 is pivoted at 103 to an arm 104, extending from the front of stamp-base 89. In the top of this spool-holder is a notch 105, into which a spring-catch 106, mounted on the front of the stamp-base 89, drops. The spool-holder and spool are thus detachably held in the position shown in Figs. 9 and 10. When it is desired to remove a stamp 94 from the stamp-base 89, the catch 106 is released and the spool-holder swings to the position shown in dotted lines, Fig. 9, and the stamp can be removed. When the new stamp is inserted, the spool-holder is returned to its original position and the ribbon is again tight under the stamp and the apparatus is ready for use. On one end of shaft 101 is a ratchet-wheel 107, locked by a pawl 108. On the end of stamp-carriage 83 is a spring 109, so adjusted that as the stamp-base 89 and attached parts approach the upper end of their stroke it will engage one tooth of the ratchet-wheel 107 and while the parts are reaching the position shown in Fig. 10 rotate the ratchet-wheel the length of one tooth, thereby gradually winding ribbon 100 onto the spool 101 and changing the portion of it which is over the face of the stamp.

On the inside walls of the stamp-case 32 are cut cam-tracks 110, as shown in Fig. 4, in which the pins 90 are adapted to travel. These cams are designed, as shown, so that when the pins are at the bottom points 111, 112, and 113 the stamp will be in exactly the desired position to print on the paper which is below it on the table of the machine and that when at one of these positions the handle 85 is released the stamp must travel to a position where it is ready to stamp at the next succeeding point. Suppose, for instance, the handle is in the position shown in Fig. 4. When the handle is depressed, the pins travel down and into notch 111, where the stamp prints. The handle is now released and under action of the spring the pin is forced in view of the shape of the cam-track to travel up to the upper position 114. On depressing the handle here the pins move to 112, then up to 115, then down to 113, and then up to 116. From here the operator moves the stamp-carriage along the horizontal track 117 back to the starting-point. Instead of enforcing the automatic travel by making curves 118 in the cam-track, as shown in Fig. 4, spring-switches—such, for instance, as the one shown at 119 in Fig. 8—may be used. In this case the spring does not present the free downward motion of the pin, but closes the path through which it came after it is past.

The ticket agent of the railroad using our machine (located for purpose of illustration at Chicago) is provided with two rolls of paper, one printed and spaced in the form shown in Fig. 6, the space there occupied by the destination, price, and date being left blank, and the other record-roll spaced as shown in Fig. 7. There is no printing on the face of this roll except the continuous numbering of the spaces. These rolls are mounted in suitable reels adjacent to the machine, and the paper 120 of Fig. 6 is drawn from left to right across the table $a$ until line 122 at the bottom of a ticket-space—as, for instance, No. 823—is on the line of knife 72. In a similar manner the agent draws the paper 123 of the second roll over until the bottom line 124 of the same numbered space on this roll is also on the line of the knife. The ticket agent is provided with a stamp 94 for each station on the road, bearing on its face the name of the station and the rate of fare. He is also provided with a stamp for each date in the year. Suppose, now, that on March 10, 1901, a passenger desires to purchase a ticket to St. Louis, to which the fare is seven dollars and fifty cents. The agent, having first inserted the date-stamp "Mch. 10, 1901," which he will not remove during the day, selects from his supply the stamp 94, bearing the words "St. Louis $7.50." He now raises latch 106, which allows spool-holder 102 to fall, so that he can insert the station-stamp in the machine, as heretofore described. He now closes catch 97 and raises and latches spool-holder 102 into the position shown in Fig. 9. He now takes hold of handle 83 and moves it and attached parts to the position of Fig. 4, (if not already there.) He now depresses the handle until the pin 90 reaches position 111, when the stamp, with the carbon-ribbon below it, strikes and prints upon the ticket at 126. The agent now releases the handle 85, and pin 90 immediately travels, as heretofore described, up the inclined cam to position 114. The handle is again depressed and the pin 90 travels to position 112, so that the stamp prints on the stub at 127. The handle is again released, and pin 90 travels to position 115. The handle is again depressed until pin 90 reaches position 113, when the same imprint is made on the accounting-strip at 128. The handle is now released and pins 90 travel to position 116, from which the stamping mechanism is moved back to the original position shown, ready to repeat the operation if another ticket to St. Louis is required, or to have the St. Louis stamp removed and another stamp bearing a different station-name, with corresponding fare price, inserted when the next passenger calls for a ticket. Having made the three impressions at 126, 127, and 128, as described, the agent now takes hold of handle 22 and moves lever 21 from the position shown in Fig. 1, where it rests against stop 129, to the left until it rests against stop 130, thereby rotating rollers 41 47 and 42 48, and thus moving the papers along tables $a$ and $b$ one numbered space, (see form of paper, Figs. 6 and 7,) so that lines 131 and 132 are in line with each other, and line 131 is directly under the knife 72, which has been elevated by having cam 75, attached to cross-head 28, attached to lever, passing under it. As lever 21 reaches the end of its stroke the knife snaps off from the top of the cam 75 and cuts the ticket 126 and stub 127 off from the roll of paper on the line 131. As the pins 43 have in moving the paper along table $a$ made the perforated line 132 between the ticket and stub the agent has only to tear the two apart on this line and give the ticket to the passenger and keep the stub himself. The paper on the accounting-roll 128 remains in a continuous strip until the end of the day, week, or month, as the case may be, when it is torn off and sent in to the accounting-office. When the knife 72 has cut off the ticket in the manner described, the agent moves lever 21 and its attached parts back to its original position, the cam 28 under action of spring 73 snapping over the end 74 of knife 72. In doing this the pawl 23 clicks idly over ratchet-wheel 20 and the rollers 41 47 and 42 48 remain at rest. It will be readily seen that by properly varying the widths of tables $a$ and $b$ and the shape of cam-track 110 only the ticket need be printed on table $a$, while two continuous accounting-records, one for the auditor and one for the agent, are printed on table $b$. In the same way a ticket and a return-ticket may be printed on table $a$.

One great difficulty with ordinary railroad-tickets is that the destination can be altered, and we avoid this by providing the stretched rubber belt 58, which is soft enough so that when the paper ticket is placed over it and struck by the steel stamp 96 the impression of the stamp sinks into the paper, and it cannot be altered without detection, yet firm enough in tension so that the impression of the stamp is not blurred, as with an ordinary soft pad.

We do not limit ourselves to having the carbon-ribbon carried by the stamp-carriage 83 and travel up and down with the stamp, for manifestly it may be held in any desired manner in any position desired where it will be between the stamps 96 and the paper of the ticket when it is stamped. It may be mounted on the stamp-carriage 83 and carried down around the lower ends of guards 92 or it may be mounted on the frame of the machine and carried over belt 58, as desired.

We do not limit ourselves to the exact details of construction shown and described. These may be varied within wide limits without departing from our invention.

Having thus described our invention, what we claim as new, and desire to secure by Letters Patent, is—

1. In apparatus of the class described, the combination of a stamp-case, a stamp-carriage adapted to travel along said case, a stamp mounted on said stamp-carriage, means adapted to normally hold said stamp in its highest position, and a member on said stamp adapted to travel in a stationary cam on the stamp-case which is so shaped that when said stamp is depressed it prints at a predetermined point and when released travels automatically to a position where it is ready to be again depressed and print at another predetermined point.

2. In apparatus of the class described, the combination of a stamp-case, a stamp-carriage adapted to travel along said case, a stamp mounted on said stamp-carriage, means adapted to normally hold said stamp in its highest position, a member on said stamp adapted to travel in a stationary cam on the stamp-case which is so shaped that when said stamp is depressed it prints at a predetermined point and when released travels automatically to a position where it is ready to be again depressed and print at another predetermined point, and means at or near the switching-points of said cam for preventing backward travel of the stamp.

3. In apparatus of the class described, the combination of a stamp-case, a stamp-carriage adapted to travel along said case, a stamp mounted on said stamp-carriage, guards on each side of the stamp rigidly attached to the stamp-carriage, vertical guide-slots in said guards, pins extending from the sides of said stamp extending through said guide-slots, means adapted to normally hold said stamp in its highest position, and a cam attached to said stamp-case, in which said pins are also adapted to travel, the shape of said cam being such that when said stamp is depressed it prints at a predetermined point on said table and when released travels automatically to a position where it is ready to be again depressed and print at another predetermined point on said table.

4. In apparatus of the class described, the combination of a stamp-case, a stamp-carriage adapted to travel along said case, a stamp-base mounted on said stamp-carriage, means for detachably securing different stamps in said stamp-base, means adapted to normally hold said stamp-base in its highest position, a member on said stamp-base entering a stationary cam on said stamp-carriage, said cam being so shaped that when said stamp is depressed it prints at a predetermined point and when released travels automatically to a position where it is ready to be again depressed and print at another predetermined point.

5. In apparatus of the class described, the combination of a stamp-case, a stamp-carriage adapted to travel along said case, a stamp-base mounted on said stamp-carriage, a carbon-ribbon mounted on and adapted to travel with the stamp-base, means for automatically moving the ribbon a small distance over the face of the stamp after each depression of the stamp-base, means adapted to normally hold said stamp-base and attached mechanism in its highest position, a member on said stamp-base entering a stationary cam on said stamp-carriage, said cam being so shaped that when said stamp is depressed it prints at a predetermined point and when released travels automatically to a position where it is ready to be again depressed and print at another predetermined point.

6. In apparatus of the class described, the combination of a table, one or more cushion printing-pads extending across said table, a stamp-case mounted above said table in line with said cushion-pad, a stamp-carriage adapted to travel along said case, a stamp mounted on said stamp-carriage, means adapted to normally hold said stamp in its highest position, a member on said stamp adapted to travel in a stationary cam on the stamp-case which is so shaped that when said stamp is depressed it prints at a predetermined point on said cushion-pad and when released travels automatically to a position where it is ready to be again depressed and print at another predetermined point farther along on said cushion.

7. In apparatus of the class described, the combination of a table, one or more cushion printing-pads extending across said table, a stamp-case mounted above said table in line with said cushion-pad, a stamp-carriage adapted to travel along said case, a stamp mounted on said stamp-carriage, means adapted to normally hold said stamp in its highest position, a member on said stamp adapted to travel in a stationary cam on the stamp-case which is so shaped that when said stamp is depressed it prints at a predetermined point on said cushion-pad and when released travels automatically to a position where it is ready to be again depressed and print at another predetermined point farther along on said cushion, means for feeding paper placed between the pad and stamp across the table a predetermined distance and for then automatically cutting off the paper.

8. In apparatus of the class described, the combination of a stamp-case having parallel sides, a stamp-carriage adapted to travel along said stamp-case, a stamp mounted on said stamp-carriage, means adapted to normally hold said stamp in its highest position, members on opposite sides of said stamp adapted to travel in stationary parallel cams on the walls of said stamp-case, which are so shaped that when the stamp is depressed it prints at a predetermined point and when released travels automatically along said stamp-case to a position where it is ready to be again depressed and print at another predetermined point.

9. In apparatus of the class described, the combination of a table, means for feeding two or more strips of paper along the table at different rates of speed, a printing-stamp mounted above and adapted to travel across said table and the strips of paper thereon, adapted when depressed to print in succession at predetermined points on each of said strips of paper.

JOHN P. EASTMAN.
TRACY F. HAWLEY.

Witnesses:
DWIGHT B. CHEEVER,
CHARLES L. HINE.